United States Patent [19]

Schurr et al.

[11] 4,083,946

[45] Apr. 11, 1978

[54] PROCESS FOR REMOVING CHLORIDE IMPURITIES FROM $TiO_2$

[75] Inventors: George Alan Schurr, Newark; Hans-Achim Dietmar Wildt, Wilmington, both of Del.

[73] Assignee: E. I. Du Pont de Nemours and Company, Wilmington, Del.

[21] Appl. No.: 780,341

[22] Filed: Mar. 23, 1977

[51] Int. Cl.² .................................. C01G 23/04
[52] U.S. Cl. .......................... 423/613; 423/610; 423/612; 55/71
[58] Field of Search ................. 423/610, 612, 613

[56] References Cited

U.S. PATENT DOCUMENTS 3,253,889  5/1966  Wildt et al. ...................... 423/613

FOREIGN PATENT DOCUMENTS 1,003,957  9/1965  United Kingdom.
1,081,549  8/1967  United Kingdom ................. 423/613

Primary Examiner—Edward Stern

[57] ABSTRACT

A process for removing chloride impurities from $TiO_2$ by injecting a gas selected from steam, air, nitrogen, or a mixture thereof, at a sonic or a supersonic velocity, a pressure of about 25–600 psi, and a temperature of about 140°–650° C., into the $TiO_2$ to disperse it, and then separating the $TiO_2$ from the gas and chlorides.

10 Claims, 1 Drawing Figure

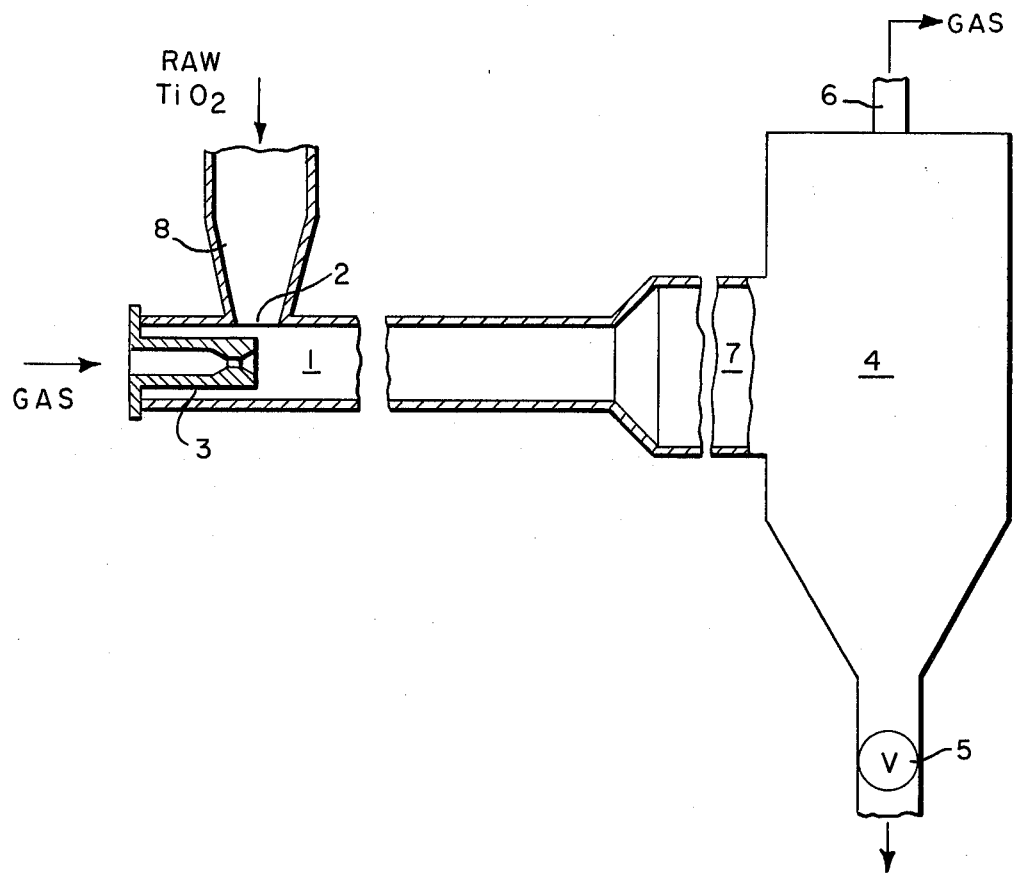

4,083,946

PROCESS FOR REMOVING CHLORIDE IMPURITIES FROM TIO₂

BACKGROUND OF THE INVENTION

This invention relates to a process for removing chloride impurities from $TiO_2$. A pigmentary $TiO_2$ can be produced by oxidizing $TiCl_4$ at elevated temperatures such as that disclosed in U.S. Pat. No. 2,488,439. The $TiO_2$ product which is entrained in gaseous reaction products emerges from the oxidation reactor at 700°–1600° C. and it can be cooled to a temperature ranging from 300°–800° C. by the procedures disclosed in U.S. Pat. Nos. 2,833,637 and 2,721,626. The cooled $TiO_2$ can be separated from the gaseous products by any suitable separation device such as a centrifuge or a cyclone. The $TiO_2$ product recovered from the separation contains a low concentration of untreated chloride impurities such as $TiCl_4$, $TiOCl_2$, HCl, and $Cl_2$ adsorbed on the surface of the $TiO_2$. Usually, about 0.1–0.4 weight percent total chlorides, expressed as HCl, is present in the product. These chloride impurities must be removed from the $TiO_2$ product because the $TiO_2$ product containing the chloride impurities cannot be used in many pigmenting applications such as paints, enamels, and finishes since the chloride impurities are incompatible with and usually react with vehicles in which the $TiO_2$ is dispersed.

In the past, calcination at 600° C. for about 2 hours has been used to remove chloride impurities from $TiO_2$. Even though this process is effective in removing impurities, it requires much time and expense.

Two other methods for the removal of chlorides from $TiO_2$ are described in U.S. Pat. No. 3,253,889 to Wildt et al., and British Pat. No. 1,003,957. The process in U.S. Pat. No. 3,253,889 relates to subjecting the $TiO_2$ while in aerosuspension at a concentration of 0.1–20 pounds of $TiO_2$ per cubic foot of aerosuspension to direct contact for a period of less than 5 minutes in a treating zone maintained at a temperature of 400°–1000° C. with a gaseous treating agent selected from water vapor, air, oxygen, and mixtures thereof. The process in British Pat. No. 1,003,957 relates to introducing highly dispersed oxides of silicon, aluminum, titanium, and/or zirconium into a treatment chamber in parallel relationship with a stream of steam which may be diluted with an inert gas so as to form a turbulent suspension of oxides in the steam, which suspension is heated at a temperature from 450°–1000° C. and removing the treated oxides and the resultant gases containing impurities from the end of the treatment chamber opposite to the end at which they were introduced. However, in both of these processes the time required to remove impurities from the prducts is relatively long. Thus, there is a need for a process which will remove chloride impurities from $TiO_2$ more rapidly than any of the above-described processes.

SUMMARY OF THE INVENTION

This invention relates to a process for removing chloride impurities from $TiO_2$ which has been produced by the vapor phase oxidation of $TiCl_4$ at elevated temperatures comprising feeding the $TiO_2$ into a treatment chamber; injecting a gas selected from steam, air, nitrogen, or a mixture thereof at a sonic or a supersonic velocity into the treatment chamber and directing the gas so that it flows crosscurrently into the $TiO_2$ such that the gas creates a pressure difference which draws the $TiO_2$ into the treatment chamber and disperses it, wherein the initial gas pressure is about 25–600 psi and its temperature is about 140°–650° C., and the weight ratio of gas to $TiO_2$ is 0.2–6.0; and separating the $TiO_2$ from the gas and chlorides.

Further, this invention relates to a process for removing chloride impurities from $TiO_2$ which has been produced by the vapor phase oxidation of $TiCl_4$ at elevated temperatures comprising feeding $TiO_2$ vertically downward into a treatment chamber, injecting a gas selected from steam, air and nitrogen, or a mixture thereof, at a sonic or a supersonic velocity, into a treatment chamber through a nozzle, such that the end of the nozzle through which the gas is expelled is located in the $TiO_2$ feed stream and gas is injected crosscurrent to the flow of $TiO_2$, wherein the initial gas pressure is about 25–600 psi and its temperature is about 140°–650° C., and the weight ratio of gas to $TiO_2$ is 0.2–6.0, and separating the $TiO_2$ from the gas and chlorides.

DETAILED DESCRIPTION OF THE INVENTION

This invention relates to a process for the removal of chloride impurities from $TiO_2$.

When $TiO_2$ is manufactured by the high temperature oxidation of $TiCl_4$ and separated from the gaseous reaction products, the $TiO_2$ contains chloride impurities such as $TiCl_4$, $TiOCl_2$, HCl, and $Cl_2$ which are adsorbed on the surface of the $TiO_2$. The $TiO_2$ in this state is referred to as raw $TiO_2$. The pigmentary properties of the raw $TiO_2$ can be improved by removing the chloride impurities from the $TiO_2$.

In accordance with the present process, raw $TiO_2$ is fed into a treatment chamber, and a gas is injected at a sonic or a supersonic velocity into the treatment chamber so that it flows crosscurrently into the $TiO_2$. This disperses the raw $TiO_2$ into substantially discrete particles and frees the chloride impurities from the surface of the $TiO_2$ particles. Sonic velocity is defined as $\sqrt{k\,R\,T°}$ wherein $k$ is the ratio of specific heats for the gases, R is the gas constant and $T°$ is the absolute temperature of the gas at stagnation. Supersonic velocity is any value greater that this. In actual practice, the maximum supersonic velocity used does not exceed 2.2 times the sonic velocity. Substantially discrete particles of $TiO_2$ means the individual $TiO_2$ crystalline particles and aggregate groups of $TiO_2$ particles.

The treatment chamber is the region in which the gas strikes the $TiO_2$ and disperses it into substantially discrete particles. The $TiO_2$ particles can be in the treatment chamber for as long as 5 seconds, however, in the actual practice of this invention, the particles will be in the treatment chamber for only about 0.1 second. In the preferred embodiments of the present invention, the treatment chamber is cylindrical; however, other forms such as conical or rectangular are possible, so long as the $TiO_2$ is dispersed into substantially discrete particles. The treatment chamber is usually attached directly to a separating device so that the $TiO_2$ can be separated from the chloride impurities and gas as soon as the $TiO_2$ has left the treatment chamber.

The gas injected into the treatment chamber can be steam, air, nitrogen, or a mixture thereof, such as a mixture of steam and air. Steam is the preferred gas because it is the most effective gas for dispersing the $TiO_2$. The pressure of the gas can be about 25–600 psi and the temperature can be about 140°–650° C. In the preferred embodiments, the pressure is about 300–400 psi and the temperature is about 200°–350° C. These conditions are preferred because they provide an optimum between effective chloride removal from $TiO_2$ and cost of operating the process.

The weight ratio of gas to $TiO_2$ is 0.2–6.0. The preferred ratio is 1.0–3.0 because this optimizes the amount of gas used with the effectiveness of chloride removal.

The gas must be injected into the treatment chamber in a direction crosscurrent to the flow of $TiO_2$. In the preferred embodiment wherein the treatment chamber is cylindrical, the gas is injected into the treatment chamber along the axis of the cylinder and the $TiO_2$ is fed into the chamber through a feed stream which is perpendicular to the flow of gas.

The gas is injected into the chamber such that it creates a pressure difference which draws the $TiO_2$ into the treatment chamber and disperses it. In the preferred embodiment, a nozzle is used to inject the gas into the chamber. In order to create a pressure difference which effectively draws the $TiO_2$ into the chamber, the end of the nozzle through which the gas exits should be located directly in the $TiO_2$ stream. The gas injected into the $TiO_2$ stream will cause the $TiO_2$ particles to disperse, thus freeing the chloride impurities which are adsorbed on the surface of the particles. The gas then forces the $TiO_2$ particles and chloride impurities out of the treatment chamber. The nozzle is preferably located near the mid point of the $TiO_2$ stream to optimize the pressure differential which draws the $TiO_2$ particles into the chamber. Too long or too short a nozzle decreases the pressure differential which reduces the flow of $TiO_2$ particles into the chamber.

The $TiO_2$ can be separated from the gas and chloride impurities by using any suitable separating devices such as a cyclone or a bag filter. In the preferred embodiments of the present invention, the treatment chamber is directly connected to the separating device so that the separation can be done immediately after the $TiO_2$ particles, gas and chloride impurities leave the treatment chamber.

DESCRIPTION OF THE DRAWINGS

FIG. 1 illustrates an apparatus which is particularly suitable for carrying out the process of the present invention.

Referring to FIG. 1, raw $TiO_2$ is fed into cylindrical treatment chamber 1 through pipe 8 and opening 2. As the raw $TiO_2$ is fed into the chamber, gas is injected at a supersonic velocity into the treatment chamber through nozzle 3 such that the gas crosscurrently contacts the raw $TiO_2$ and creates a pressure difference which draws the $TiO_2$ into the chamber. The end of nozzle 3 through which the gas is expelled is located directly under opening 2. This means that the end of nozzle 3 is in the $TiO_2$ feed stream. The gas disperses the $TiO_2$ into substantially discrete particles and causes the chloride impurities to separate from the $TiO_2$. Further, the gas forces the $TiO_2$ from treatment chamber 1 through discharge chamber 7 and into cyclone 4 which separates the $TiO_2$ from the gas and chloride impurities. The gas and chloride impurities leave cyclone 4 through pipe 6 and $TiO_2$ exits through valve 5.

The following Examples illustrate the present invention. All parts, percentages, and proportions are by weight unless otherwise indicated.

Examples 1 and 2 are carried out using the apparatus of FIG. 1. Treatment chamber 1 is a cylindrical aluminum pipe 1¼ inches inside diameter and 17 inches long and discharge chamber 7, which connects to cyclone 4, is a cylindrical aluminum pipe 6 inches inside diameter and 3' long. Raw $TiO_2$ enters treatment chamber 1 through pipe 8 and opening 2 which is an elliptical opening with radial inside dimensions of ⅜ × 1½ inches. Nozzle 3 is a carbon steel nozzle .59 inches inside diameter and its tip is placed in the mid point of the $TiO_2$ stream.

EXAMPLE 1

Seven hundred forty-two lb/hr of raw $TiO_2$ containing 0.25 weight percent chloride impurities, based on the total weight of raw $TiO_2$, is fed through pipe 8 into treatment chamber 1. The raw $TiO_2$ is contacted by steam which enters treatment chamber 1 through nozzle 3 at 1000 lb/hr, 240° C., and 64 psi. The velocity of the steam at the throat of the nozzle is 1800 feet per second. The steam to pigment ratio is 1.35. The $TiO_2$ is separated from the steam and chlorides by a cyclone. After separation, the $TiO_2$ contains 0.12 weight percent chloride impurities.

EXAMPLE 2

Two thousand one hundred thirty lb/hr of raw $TiO_2$ containing 0.25 weight percent chloride impurities, based on the total weight of raw $TiO_2$, is fed through pipe 8 into treatment chamber 1. The raw $TiO_2$ is contacted by steam which enters treatment chamber 1 through nozzle 3 at 1000 lb/hr, 240° C., and 64 psi. The velocity of the steam at the throat of the nozzle is 1800 feet per second. The steam to pigment ratio is 0.47. The $TiO_2$ is separated from the steam and chlorides by a cyclone. After the separation, the $TiO_2$ contains 0.12 weight percent chloride impurities.

EXAMPLES 3–10

Examples 3–10 are carried out using a modified version of the apparatus of FIG. 1. Treatment chamber 1 is a cylindrical carbon steel pipe 1 inch inside diameter and 10' long. The treatment chamber is connected directly to cyclone 4. Raw $TiO_2$ enters treatment chamber 1 through pipe 8 and opening 2 which is a circular opening. Gas enters the treatment chamber through nozzle 3 which is a stainless steel nozzle of varying diameter and its tip is placed in the mid point of the $TiO_2$ stream. The gas contacts the raw $TiO_2$ and forces it into the cyclone.

Table 1 lists the varying conditions for each example. The raw $TiO_2$ contains 0.22 weight percent chloride impurities based on the total weight of raw $TiO_2$.

TABLE 1

| Example | Type of Gas | Gas Velocity (ft/sec.) | Glass Flow Rate (g/min.) | Gas Pressure (PSI) | Gas Temp. (° C.) | Nozzle Inside Diameter (inches) | $TiO_2$ Feed Rate (g/min.) | Chloride Impurities in the $TiO_2$ after separation (%) |
|---|---|---|---|---|---|---|---|---|
| 3 | steam | 2100 | 2135 | 40 | 430 | 0.4 | 1123 | 0.103 |
| 4 | steam | 2375 | 1905 | 40 | 625 | 0.4 | 1058 | 0.067 |
| 5 | steam | 1900 | 241.8 | 30 | 300 | 0.161 | 216.7 | 0.131 |
| 6 | steam | 1872 | 483.7 | 70 | 282 | 0.161 | 407.0 | 0.101 |
| 7 | steam | 1872 | 3660 | 70 | 282 | 0.4 | 3080 | 0.101 |

TABLE 1-continued

| Example | Type of Gas | Gas Velocity (ft/sec.) | | Glass Flow Rate (g/min.) | Gas Pressure (PSI) | Gas Temp. (° C.) | Nozzle Inside Diameter (inches) | TiO$_2$ Feed Rate (g/min.) | Chloride Impurities in the TiO$_2$ after separation (%) |
| --- | --- | --- | --- | --- | --- | --- | --- | --- | --- |
| 8 | steam | 1870 | | 3660 | 70 | 278 | 0.4 | 2000 | 0.089 |
| 9 | air | 1696 | | 1910 | 30 | 393 | 0.379 | 1440 | 0.121 |
| 10 | air & water | 1680 | air water | 1910 75 | 30 | 366 | 0.379 | 1610 | 0.115 |

What is claimed is:

1. A process for removing chloride impurities from TiO$_2$ which has been produced by the vapor phase oxidation of TiCl$_4$ at elevated temperatures, comprising:
   A. feeding the TiO$_2$ into the treatment chamber
   B. injecting a gas selected from steam, air, and nitrogen or a mixture thereof at a sonic or a supersonic velocity into the treatment chamber directly in the TiO$_2$ feed stream and directing the gas so that it flows crosscurrently into the TiO$_2$ such that the gas creates a pressure difference which draws the TiO$_2$ into the treatment chamber for 0.1 to 5 seconds, whereby the gas causes the TiO$_2$ to disperse into discrete particles, and causes the chloride impurities to separate from the particles, wherein the initial gas pressure is about 25–600 psi and its temperature is about 140°–650° C., and the weight ratio of gas to TiO$_2$ is 0.2–6.0, and
   C. separating the TiO$_2$ from the gas and chlorides using a cyclone or a bag filter.

2. The process of claim 1 wherein the treatment chamber is cylindrically shaped.

3. The process of claim 2 wherein the gas is steam.

4. The process of claim 3 wherein the gas pressure is about 300–400 psi and the gas temperature is about 200°–350° C.

5. The process of claim 4 wherein the weight ratio is about 1–3.

6. A process for removing chloride impurities from TiO$_2$ which has been produced by the vapor phase oxidation of TiCl$_4$ at elevated temperatures, comprising:
   A. feeding TiO$_2$ vertically downward into a treatment chamber, wherein the TiO$_2$ remains for 0.1 to 5 seconds,
   B. injecting a gas selected from steam, air, and nitrogen, or a mixture thereof, at a sonic or a supersonic velocity, into a treatment chamber through a nozzle, such that the end of the nozzle through which the gas is expelled is located in the TiO$_2$ feed stream and the gas is injected crosscurrent to the flow of TiO$_2$, whereby the gas causes the TiO$_2$ to disperse into discrete particles and causes the chloride impurities to separate from the particles, wherein the initial gas pressure is about 25–600 psi and its temperature is about 140°–650° C., and the weight ratio of gas to TiO$_2$ is 0.2–6.0, and
   C. separating the TiO$_2$ from the gas and chlorides using a cyclone or a bag filter.

7. The process of claim 6 wherein the treatment chamber is cylindrically shaped.

8. The process of claim 7 wherein the gas is steam.

9. The process of claim 8 wherein the gas pressure is about 300–400 psi and the gas temperature is about 200°–350° C.

10. The process of claim 9 wherein the weight ratio if about 1–3.

* * * * *